Patented Oct. 30, 1928.

1,689,728

UNITED STATES PATENT OFFICE.

BIRGER JOHNSON, OF STOCKHOLM, SWEDEN.

METHOD OF TREATING AQUEOUS EMULSIONS OF TAR.

No Drawing. Application filed March 6, 1925, Serial No. 13,637, and in Sweden March 12, 1924.

This invention relates to an improved method of treating emulsions and more especially to a method of separating the water from aqueous emulsions of tar.

It happens sometimes that aqueous emulsions are formed in gas works under certain conditions, the tar forming in such case with the water an emulsion which makes the tar practically valueless.

The object of the present invention is to remove the emulsive or colloidal state in such emulsions in a simple and cheap manner. The invention consists, chiefly, in adding to the emulsion a carboxy acid which is soluble in the tar constituent of the emulsion but substantially insoluble in water. Such acids are for instance rosin acid, oleic acid, stearic acid, palmitic acid, arachidic acid and linolenic acid.

*Example.*—To an emulsion consisting of about 49.5% by weight of tar and about 49.5% by weight of water and about 1% by weight of ammonia 2% by weight of oleic acid is added and intimately mixed with the emulsion at a temperature of about 70° C. The oleic acid is dissolved by the tar oils and by this the equilibrium of the emulsion is disturbed so that the water is separated and rises when the tar emulsion is left to stand for some time while the temperature is maintained or is somewhat increased. The water can then be drawn off from above or the tar be drawn off from below. The separation of the water can be accelerated by centrifuging the emulsion when the added oleic acid has dissolved in the tar oils.

What I claim is:—

1. Method of separating aqueous emulsions of tar into their constituents, consisting in mixing the emulsion with a carboxy acid which is substantially insoluble in water but soluble in the tar constituent of the emulsion and leaving the mixture to stand at an elevated temperature until the water is separated from the tar.

2. Method of separating aqueous emulsions of tar into their constituents, consisting in mixing the emulsion with a carboxy acid which is substantially insoluble in water but soluble in the tar constituent of the emulsion and leaving the mixture to stand at a temperature of about 60 to 70° C. until the water is separated from the tar.

In testimony whereof I have signed my name.

BIRGER JOHNSON.